United States Patent
Van Holthe Tot Echten

(10) Patent No.: US 10,562,711 B2
(45) Date of Patent: Feb. 18, 2020

(54) MODULAR SYSTEM FOR MOTOR-OPERATED CONVEYING ROLLERS

(71) Applicant: INTERROLL HOLDING AG, Sant' Antonino (CH)

(72) Inventor: Jurriaen Van Holthe Tot Echten, BH Heerlen (NL)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 16/313,950

(22) PCT Filed: Jun. 30, 2017

(86) PCT No.: PCT/EP2017/066236
§ 371 (c)(1),
(2) Date: Dec. 28, 2018

(87) PCT Pub. No.: WO2018/002285
PCT Pub. Date: Jan. 4, 2018

(65) Prior Publication Data
US 2019/0233216 A1    Aug. 1, 2019

(30) Foreign Application Priority Data

Jun. 30, 2016 (DE) .................. 10 2016 112 051

(51) Int. Cl.
B65G 23/08      (2006.01)
(52) U.S. Cl.
CPC .......... *B65G 23/08* (2013.01); *B65G 2207/30* (2013.01)

(58) Field of Classification Search
CPC ..................................................... B65G 23/08
(Continued)

(56) References Cited

U.S. PATENT DOCUMENTS 5,180,344 A    1/1993 Hall
5,442,248 A    8/1995 Agnoff
(Continued)

FOREIGN PATENT DOCUMENTS

AT        508662        3/2011
AT         13066        5/2013
(Continued)

OTHER PUBLICATIONS

US 2016/0257496 A1, Ruggeri, Sep. 8 (Year: 2016).*

*Primary Examiner* — Douglas A Hess
(74) *Attorney, Agent, or Firm* — Price Heneveld LLP

(57) ABSTRACT

A modular system of motorized conveyor rollers comprises a conveyor roller tube, a first axle unit, a second axle unit, a first bearing unit on a first tube end and a second bearing unit on a second tube end about which the conveyor roller tube is mounted rotatably about the first and second axle units, respectively, and an electric motor for generating a torque between the conveyor roller tube and the second axle unit. The modular system comprises, as the electric motor, a motor of a first design, which may be coupled to the conveyor roller tube via a first interface and to the second axle unit via a second interface, and a motor of a second design different from the first design, which may be coupled to the conveyor roller tube via the first interface and to the second axle unit via the second interface.

26 Claims, 2 Drawing Sheets

(58) Field of Classification Search
USPC .......................................................... 198/788
See application file for complete search history.

(56) References Cited

U.S. PATENT DOCUMENTS

| | | | |
|---|---|---|---|
| 5,485,590 | A | 1/1996 | Hyatt et al. |
| 5,530,643 | A | 6/1996 | Hodorowski |
| 6,117,318 | A | 9/2000 | Simonelli |
| 6,124,656 | A | 9/2000 | Jensen |
| 6,200,036 | B1 | 3/2001 | Girardey |
| 6,240,335 | B1 | 5/2001 | Wehrung et al. |
| 6,633,278 | B1 | 10/2003 | Hoegener et al. |
| 6,672,449 | B2 | 1/2004 | Nakamura et al. |
| 6,701,214 | B1 | 3/2004 | Wielebski et al. |
| 7,112,901 | B1 * | 9/2006 | Soitu .................. H02K 3/22 310/256 |
| 7,207,433 | B2 | 4/2007 | Schaefer |
| 8,006,829 | B2 | 8/2011 | Itoh et al. |
| 8,381,901 | B2 | 2/2013 | Yamamoto |
| 8,708,877 | B2 * | 4/2014 | Kirihara ............... E06B 9/72 492/15 |
| 8,757,363 | B2 | 6/2014 | Combs et al. |
| 8,872,465 | B2 * | 10/2014 | Umans .................. H02P 1/46 164/109 |
| 9,359,142 | B2 | 6/2016 | Jepsen |
| 9,493,310 | B2 * | 11/2016 | Dudek .................. B65G 39/02 |
| 9,618,056 | B2 | 4/2017 | Itoh |
| 9,731,900 | B2 | 8/2017 | Ruggeri |
| 9,840,393 | B2 * | 12/2017 | Kang .................... B65H 51/20 |
| 9,994,398 | B1 * | 6/2018 | Hansson .............. B65G 39/02 |
| 10,173,842 | B2 * | 1/2019 | Dudek ................ B65G 13/075 |
| 10,301,118 | B2 * | 5/2019 | Tiedemann ........... B65G 23/08 |
| 2002/0010527 | A1 | 1/2002 | Wielebsi et al. |
| 2003/0168316 | A1 | 9/2003 | Knepple et al. |
| 2004/0144623 | A1 | 7/2004 | Newsom et al. |
| 2005/0083188 | A1 | 4/2005 | Choi |
| 2006/0293782 | A1 | 12/2006 | Rees |
| 2007/0197072 | A1 | 8/2007 | Hvidberg et al. |
| 2008/0270427 | A1 | 10/2008 | Franke et al. |
| 2010/0322473 | A1 | 12/2010 | Taylor et al. |
| 2012/0024669 | A1 | 2/2012 | Danelski et al. |
| 2012/0175223 | A1 | 7/2012 | Breen et al. |
| 2012/0175225 | A1 | 7/2012 | Breen et al. |
| 2012/0211330 | A1 | 8/2012 | Ziegler |
| 2012/0259436 | A1 | 10/2012 | Resurreccion et al. |
| 2012/0290126 | A1 | 11/2012 | Combs et al. |
| 2013/0134017 | A1 | 5/2013 | Hall et al. |
| 2013/0190915 | A1 | 7/2013 | Choo et al. |
| 2014/0156063 | A1 | 6/2014 | Neiser et al. |
| 2014/0277698 | A1 | 9/2014 | Combs et al. |
| 2014/0326582 | A1 | 11/2014 | Sakaguchi |
| 2015/0068874 | A1 | 3/2015 | Jepsen et al. |
| 2015/0151921 | A1 | 6/2015 | Collot |
| 2016/0080526 | A1 | 3/2016 | Meyer-Graefe |
| 2016/0318714 | A1 | 11/2016 | Reischl |
| 2018/0009607 | A1 | 1/2018 | Tiedemann |

FOREIGN PATENT DOCUMENTS

| | | |
|---|---|---|
| CN | 2033808 U | 3/1989 |
| CN | 2199164 Y | 5/1995 |
| CN | 203682423 U | 7/2014 |
| DE | 1978258 | 2/1968 |
| DE | 3538173 | 1/1987 |
| DE | 4230729 | 3/1993 |
| DE | 69306884 | 5/1997 |
| DE | 19811130 | 9/1999 |
| DE | 102006004421 | 8/2006 |
| DE | 102006054575 | 9/2008 |
| DE | 102008053557 | 9/2009 |
| DE | 102008018205 | 12/2009 |
| DE | 202008017534 | 12/2009 |
| DE | 20200902821 | 2/2011 |
| DE | 2002009012822 | 2/2011 |
| DE | 202012000793 | 4/2012 |
| DE | 102010044027 | 5/2012 |
| DE | 102011004802 | 8/2012 |
| DE | 102011109531 | 2/2013 |
| DE | 102014222171 | 5/2016 |
| DE | 102015106026 | 8/2016 |
| DE | 102015104130 | 9/2016 |
| DE | 102015106034 | 10/2016 |
| DE | 102015106024 | 11/2016 |
| DE | 102015107167 | 11/2016 |
| DE | 102015114030 | 3/2017 |
| EP | 1021664 | 1/2002 |
| EP | 1454851 | 9/2004 |
| EP | 1656312 | 5/2006 |
| EP | 1675244 | 6/2006 |
| EP | 2369211 | 9/2011 |
| EP | 2455310 | 5/2012 |
| EP | 3212543 A1 | 9/2017 |
| JP | S5741821 | 3/1982 |
| JP | S5890447 | 5/1983 |
| JP | S59180609 | 10/1984 |
| JP | S6015308 | 1/1985 |
| JP | H05236612 | 9/1993 |
| JP | 2003026603 | 1/2003 |
| JP | 2003104534 | 4/2003 |
| JP | 2004098554 | 4/2004 |
| JP | 2014516895 | 7/2014 |
| JP | 2014142740 | 8/2014 |
| WO | 0203153 | 1/2002 |
| WO | 02098768 | 5/2002 |
| WO | 2007087997 | 8/2007 |
| WO | 2010142029 | 12/2010 |
| WO | 2011029120 | 3/2011 |
| WO | 2012094690 | 7/2012 |
| WO | 2012113922 | 8/2012 |
| WO | 2012154650 | 11/2012 |
| WO | 2013000006 | 1/2013 |
| WO | 2013000006 A2 | 1/2013 |
| WO | 2013016833 | 2/2013 |
| WO | 2014011459 | 1/2014 |
| WO | 2014057984 | 4/2014 |
| WO | 2015052631 | 4/2015 |
| WO | 2016066495 A1 | 5/2016 |
| WO | 2016169982 | 10/2016 |
| WO | 2016169986 | 10/2016 |
| WO | 2016177906 | 10/2016 |
| WO | 2014178399 | 2/2017 |
| WO | 2018009607 A1 | 1/2018 |

* cited by examiner

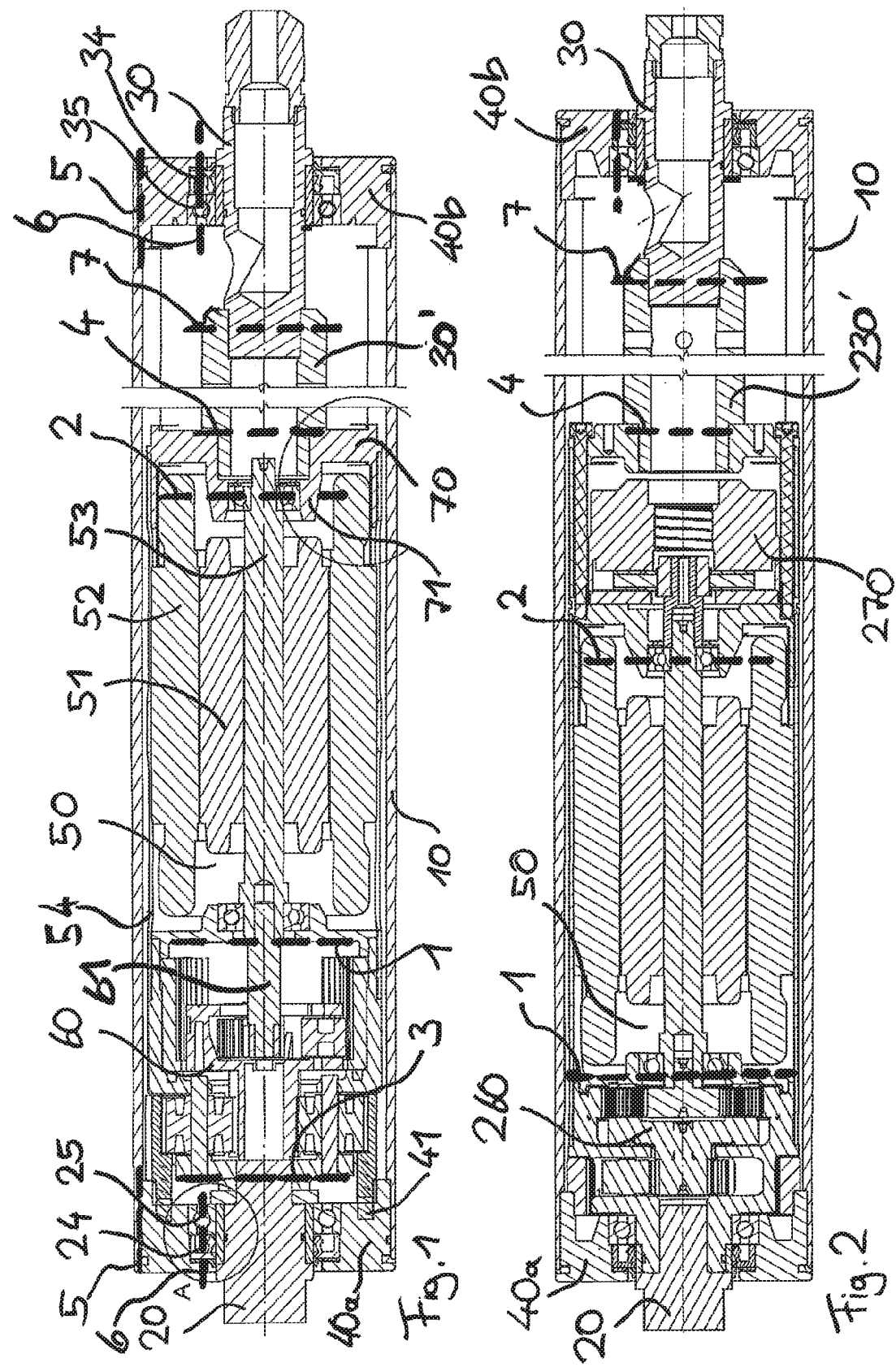

MODULAR SYSTEM FOR MOTOR-OPERATED CONVEYING ROLLERS

CROSS-REFERENCE TO FOREIGN PRIORITY APPLICATION

The present application claims the benefit under 35 U.S.C. §§ 119(b), 119(e), 120, and/or 365(c) of PCT/EP2017/066236 filed Jun. 30, 2017, which claims priority to German Application No. 102016112051.0 filed Jun. 30, 2016.

FIELD OF THE INVENTION

The invention relates to a modular system of motorized conveyor rollers, comprising: a conveyor roller tube, a first axle unit, which is integrated in a first end of the conveyor roller tube, a second axle unit, which is integrated in a second end of the conveyor roller tube that is opposite the first end, a first bearing unit on the first end and a second bearing unit on the second end, about which the conveyor roller tube is mounted rotatably about the first and second axle units, respectively, an electric motor arranged in the conveyor roller tube and mechanically coupled between the second axle unit and the conveyor roller tube for generating a torque between the conveyor roller tube and the second axle unit.

A further aspect of the invention is a motorized conveyor roller, which was produced from such a modular system, and a method for producing motorized conveyor rollers by means of a modular system.

BACKGROUND OF THE INVENTION

Motorized conveyor rollers of this kind are used for various purposes. A key application of such motorized conveyor rollers is larger and smaller logistics units or conveyor devices, in which such motorized conveyor rollers are used as elements of conveyor systems in combination with idle rollers or driven rollers, which are driven and set in rotation by the motorized conveyor roller via chains, belts, or the like. The rollers are arranged in sequence and form a conveyor line. In the sense of this invention, a motorized conveyor roller is also understood to mean a so-called drum motor, which, for example, serves as a drive element for belt conveyors and, therefore, has a higher performance class, optionally an internal cooling by a fluid, and a higher load level of the transmission than motorized conveyor rollers for roller conveyor lines.

Motorized conveyor rollers basically consist of an electric drive motor in the interior of a conveyor roller tube, which sets the conveyor roller tube in rotation with respect to an axle. The axle is typically held stationarily in a torque-proof manner in a frame and can be formed by two individual axle stubs at both ends of the conveyor roller or by a continuous axle body, which can also be made of several parts.

Motorized conveyor rollers are products that are subjected to varying high demands. A very quiet running is required in order to keep the noise level low in conveyor devices, which typically comprise a plurality of such motorized conveyor rollers. A cost-effective production method is also required, as these are products that are used in large quantities. Another requirement is for motorized conveyor rollers to be available in different variants. Different applications also require motorized conveyor rollers with different conveyor roller tube lengths in order to fit specific product dimensions or conveying capacities in each case. Varying requirements in terms of velocity or conveying speed and in terms of torque are also posed on motorized conveyor rollers.

Motorized conveyor rollers are, therefore, constructed for different purposes. Conveyor rollers that have a high performance and a long length in order to be able to transfer a torque corresponding to the length are known. Also known are conveyor rollers that have a high velocity in order to achieve high conveying speeds. In principle, a user of such conveyor rollers can thus select and use the conveyor roller suitable for said user. In principle, motorized conveyor rollers can be equipped with a direct drive, in which the torque generated by the electric motor and the motor velocity act directly between one or both axle units and the conveyor roller tube. However, motorized conveyor rollers having a single- or multi-stage transmission or several transmissions connected in series as gear stages are mainly used in addition to these transmission-less conveyor rollers. In these transmission-equipped conveyor rollers, a torque transfer to the transmission input shaft and from the transmission output shaft is required, and the torque on the transmission housing must be supported. To this end, various ways of supporting and transferring torque can be considered. In principle, support can be provided and torque transferred on one or both axle units, on the electric motor and on the conveyor roller tube. For example, the rotor of the electric motor can be coupled to the transmission input shaft, the transmission output shaft can be coupled to the conveyor roller tube, the transmission housing and the stator can be coupled to one axle unit, to a corresponding axle unit in each case or to both axle units, and the transmission housing and the stator can also be coupled to each other. An internal rotor or an external rotor can be used as a rotor. A spur gear transmission, planetary gear transmission, or other gearing system designs can be used as a transmission.

This possibility of choices, although desired, is nevertheless associated with numerous disadvantages. For one thing, conveyor rollers often cannot be interchanged, either in terms of geometric dimensions or in terms of performance data. This makes it difficult to replace conveyor rollers in the event of a defect and, in applications in which a quick replacement is necessary, it leads to greater effort and expenses for the user or for a replacement parts dealer in terms of stocking. Furthermore, the design of the conveyor rollers adapted to the respective requirements requires maintaining extensive stocks of the individual components that are installed in such conveyor rollers. Lastly, the method of constructing conveyor rollers is complicated and an adaptation to changing requirements is often only possible with a great amount of effort, if at all.

SUMMARY OF THE INVENTION

The invention addresses the problem of resolving these trade-offs and providing a motorized conveyor roller that not only meets the typical requirements in terms of its features but also permits a replacement or repair without having to maintain extensive stocks.

This is achieved by a modular system of the aforementioned nature comprising, as an electric motor, a motor of a first design, which is coupled to the conveyor roller tube via a first interface and to the second axle unit via a second interface, and a motor of a second design different from the first design, which is coupled to the conveyor roller tube via the first interface and to the second axle unit via the second interface.

According to the invention, motorized conveyor rollers of varying designs can be produced. The components of the individual motorized conveyor roller in question are in this case carefully matched to one another and as a whole fulfill the requirements set in that the electric motor and the transmission are, for example, adapted to the speed and torque needed in the conveyor device and in that an electric motor is adapted to the conveyor roller tube length in terms of its performance. The motorized roller according to the invention is thus constructed from a modular system.

The modular system comprises a first axle unit and a second axle unit, which can be embodied in standardized fashion; i.e., have interfaces to the other components of the motorized conveyor roller that are uniform and suitable for having a plurality of variants of the other components connected to them. The modular system furthermore has a conveyor roller tube, which can likewise have a standardized interface or a plurality of standardized interfaces to the rest of the components of the motorized conveyor roller. In principle it is understood that the conveyor roller tube itself can already be contained in several variants in the modular system, for instance in variants that differ in terms of their length or in variants that differ in terms of their surface; i.e., the outer circumferential area of the conveyor roller tube.

In addition to these components, the modular system also comprises bearing units on the first and second ends, which are typically standardized. An electric motor is also comprised.

Two or more different electric motors are contained in this modular system. These motors are integrated in the motorized roller by means of matching interfaces and the interfaces standardized in this manner ensure the necessary functional integration of the motor, namely the torque transfer in particular. With the modular system according to the invention, in principle a motorized conveyor roller can be constructed that is technologically balanced in terms of its components, which fit and function together, and that attains a desired long service life in a reliable manner, without a high degree of customization in terms of manufacturing and stocking being required for this.

In this case, design is understood to mean the motor type, for example, a brushless commutated motor or a design with brush commutation, a design as a DC motor or a design as a three-phase motor, or other design variants. Thus, the modular system makes it possible to produce conveyor rollers that serve as replacements for motorized conveyor rollers, and to adapt the design of the electric motor of the motorized conveyor roller to be replaced and to ensure system compatibility. Furthermore, an adaptation to national or regional standards can be made easily and without additional manufacturing and warehousing effort and expenditure.

It is particularly preferable if the first design is a synchronous motor and the second design is an asynchronous motor, or if the first design is a motor with a first motor output and the second design is a motor with a second motor output different from the first motor output. According to this embodiment, the two designs are constituted by a synchronous motor on the one hand and by an asynchronous motor on the other hand, thus permitting an economical and inventory-reducing adaptation of the motor design to different conveyor systems. As an alternative, the motors of the first and second designs differ in terms of their motor output so that motorized conveyor rollers with electric motors of varying drive power can be produced from the modular system economically and without additional inventory effort and expenditure.

According to a first preferred embodiment, provision is made such that the electric motor is connected by means of the first interface to a transmission module, which reduces the torque of the electric motor and transfers it via a third interface to the conveyor roller tube, wherein as a transmission module, the modular system comprises a first transmission with a first reduction ratio and a second transmission different from the first transmission, which has a second reduction ratio different from the first reduction ratio. According to this embodiment, the modular system according to the invention further comprises a transmission module, which can be selectively formed by a first transmission or by a second transmission, which differ in terms of their reduction ratios. According to the invention, each of these transmissions is connected to the electric motor by means of a third interface. Both or all transmissions can be directly connected to this third interface, thereby achieving a standardization of the connection between the electric motor and the transmission and thus achieving advantages in terms of assembly and stocking of replacement parts.

In principle it is understood that the first and second transmissions can, in turn, be constructed in such a way that they can be coupled and thus give rise to a modular linkage of the transmissions. This means that the transmission module is composed of a plurality of transmissions and one, two, three, or more transmissions can thus be coupled via interfaces on the transmissions. In this case the transmission module can be formed by, for example, one transmission with a single gear stage and by a second transmission that is composed of two transmissions as two gear stages. The two transmissions of the second transmission are coupled to one another and form two gear stages of this transmission for achieving a multiplication of the reduction ratios of the two gear stages.

A transmission of the modular system can be single-stage or multi-stage (e.g., two- or three-stage). In principle, the support and torque coupling of the transmission is achievable via the corresponding interfaces with the electric motor, with the conveyor roller tube or a component fastened onto the conveyor roller tube, such as an end cap, and/or with one or both axle units, wherein a direct coupling or a coupling via interposed coupling elements is possible. In the case of planetary gear transmissions, the transmission input, the transmission output, and the transmission support can be selectively formed on the ring gear, sun gear, or planet gear carrier. The torque coupling in the area of the respective interfaces can be embodied in a force-fitting, positively locking or material-locking manner, or by combinations thereof.

According to another preferred design, provision is made such that the modular system comprises, as a transmission module, a first transmission with gears of a first material and a second transmission with gears of a second material different from the first material. In some applications of conveyor rollers, the option of being able to provide the transmission with gears of different materials in a variable manner has proven advantageous. On the one hand, selecting a cheaper though less durable material permits an adaptation of the transmission to lower capacity conveyor rollers yet still ensures an adequate service life at lower capacity and with reduced manufacturing costs. On the other hand, noise emission can be reduced by using suitably adapted materials in the transmission in applications in which an especially low noise emission of the conveyor roller is required. In principle, it is understood that the first and second transmissions can have matching reduction ratios and still be made of different materials, but can also differ in terms of both reduction ratio and material.

According to another preferred embodiment, provision is made such that the modular system comprises, as a transmission module, a first transmission having a planetary gear system and a second transmission having a design different from the planetary gear system, in particular, a spur gear system. According to this embodiment, the modular system enables two transmissions of different design to be selectively connected to the electric motor via the second interface. In this case, a design of a transmission is understood to mean the gear arrangement or lines of force. In particular, use can be made of both a planetary gear design and a spur gear design, although other designs, such as worm gear transmissions or bevel gear transmissions, can also be used in certain applications.

In addition to these options for the modular configuration of conveyor rollers, in many applications it is desirable to customize a conveyor roller further such that additional functions are performed by this conveyor roller. Such additional functions can arise from different requirements. For example, a specific sensing additional function may be expected of the motorized conveyor roller, or a mechanical additional function may be expected of the individual motorized conveyor roller, optionally as a composite effect within the entire conveyor device.

However, there are trade-offs in providing these additional functions and in individually adapting motorized conveyor rollers in terms of their construction. In turn, the customization that becomes necessary as a result complicates both manufacturing and stocking spare parts. Because conveyor device downtimes caused by breakdowns need to be remedied as quickly as possible in logistics applications, this is in conflict with the requirement of having spare parts ready for the fastest possible delivery.

This disadvantage can be overcome by further developing the modular system according to the invention by means of a modular transfer element, which is integrated between the electric motor and the second axle unit by connecting the modular transfer element to the electric motor by means of the second interface and to the second axle unit by means of a fourth interface, the torque being transferred between the electric motor and the second axle unit via the second and fourth interfaces, wherein as a modular transfer element, a first functional add-on module, which performs an electromechanical, sensing or thermal function, and a second functional add-on module, which can be integrated in the conveyor roller instead of the first functional add-on module and which performs an electromechanical, sensing or thermal function that differs from the function of the first functional add-on module.

According to this further development, provision is made of a modular system from which motorized conveyor rollers can be produced or assembled.

According to this further development, provision is made of a modular transfer element that is integrated between the electric motor and the second axle unit. The modular transfer element can be formed on the one hand by a first functional add-on module. According to the invention, this first functional add-on module is not only used for transferring a torque between the electric motor and the second axle unit, but also performs an additional function. This additional function can be an electromechanical function, a sensing function, or a thermal function. For example, the add-on module can be used to detect a torque with sensors, to detect a velocity with sensors, or to detect a rotation angle with sensors. As an alternative or in addition, the add-on module can be used to convert braking energy, which is generated as the rotation speed of the conveyor roller tube is slowed, into electrical energy and temporarily store it or feed it into a mains supply to which the add-on module is connected. As an alternative or in addition, for example, the add-on module can be used to drain off, temporarily store, or convert heat generated in the electric motor or other components of the conveyor roller in order to thereby lower or locally displace the temperature in the interior of the conveyor roller tube and thus reduce the temperature on temperature-sensitive components of the conveyor roller. A second add-on module is also contained in the modular system. This second add-on module can be connected to the second and fourth interfaces instead of the first add-on module. The first and second functional add-on modules thus perform different additional functions so that by selecting the first or second functional add-on module, the modular system enables the production of conveyor rollers with different additional functions without for this purpose having to change the mounting method and connection configuration for these add-on modules inside the conveyor roller.

The modular system according to the invention can also be further developed by a torque-transferring intermediate piece without any electromechanical, sensing, or thermal function, which is, instead of the first and second functional add-on modules, connected to the electric motor by means of the second interface and to the second axle unit by means of the fourth interface. This torque-transferring intermediate piece can be embodied as an axle element or as a shaft element. The intermediate piece is used to transfer a torque from the second axle unit to the electric motor. This intermediate piece can be contained in different length variations in the modular system, for example, in order thus to equip and suitably adapt conveyor rollers with different conveyor roller tube lengths.

The torque-transferring intermediate piece of the modular system, as well as the first and second functional add-on modules, are configured in such a way that they have a matching second interface, with which they can be or are connected to the electric motor, and a matching fourth interface, with which they can be or are connected to the second axle unit. This means that a corresponding second interface is formed on the electric motor or on each variant of an electric motor inside the modular system, which interface is configured for connection to a torque-transferring intermediate piece and for connection to a first functional add-on module and that in corresponding fashion, a fourth interface is present on the second axle unit, which is suitably configured for connection to the torque-transferring intermediate piece and to the first functional add-on module. It is understood that the interfaces are suitable for being connected to both the intermediate piece and the add-on module, wherein, however, the intermediate piece and the add-on module can be alternatively connected to the first and second interfaces, in other words, either the intermediate piece or the first functional add-on module is installed in a conveyor roller. It is understood in this case that the first functional add-on module can also be formed by two components, for example, by a first component, which performs the desired additional function, and by a second component, which serves as an add-on intermediate piece and enables the functional add-on module to be adapted to different conveyor roller lengths or to different dimensions of other variants of components inside the conveyor roller tube. In this case the two components of the functional add-on module are interconnected, and one of the two components forms the first interface and the other component forms the second interface.

This embodiment makes it possible to produce motorized conveyor rollers economically that offer a high degree of versatility in terms of additional functions, but without the manufacturing costs and the effort for stocking replacement parts for these conveyor rollers being increased as a result. According to the invention, a variable component is also provided between two defined interfaces inside a conveyor roller tube, which in a simple way makes it possible to produce conveyor rollers with additional functions or without additional functions, and optionally to retrofit them with additional functions during later use as well.

According to a preferred embodiment, the modular system according to the invention is further developed in that the second and fourth interfaces are identical. The modular system according to the invention basically comprises a first functional add-on module and a second functional add-on module, and optionally an intermediate piece, which can each be used alternatively as a modular transfer element in the conveyor roller. The preferred matching embodiment of the second and fourth interfaces enables the second axle unit to be coupled directly to the electric motor. In applications in which a functional add-on element is not installed, the second axle unit can thus be dimensioned in such a way that it bridges the unused clearance and can be fastened by its fourth interface directly on the second interface of the motor. In addition, this further development enables several functional add-on modules to be coupled to one another and integrated in the motorized roller. Several functions can thus also be assembled in modular fashion and integrated in the motorized roller via correspondingly standardized and identical interfaces.

Moreover, the two functional add-on modules can also be used for performing two matching, amplifying additional functions: for example, doubling a braking function performed by one add-on module by integrating a second add-on module having the same function.

A connection of interfaces is basically understood to mean that via this connection, a torque corresponding to the output of the electric motor can preferably be transferred, and that a positioning (in particular a centering) is preferably also performed, which in turn performs the necessary axis alignment of the components of the conveyor roller. An interface is understood to mean a connection between two components, which, in principle, has two structured connection sides that can be interconnected. These two structured connection sides can be different from one another yet still fit together, or they can be embodied identically. For example, an interface can be formed by a flange-flange connection, an inner peripheral/outer peripheral connection, a bolted crimping of two surfaces, and the like. In addition to this embodiment, the modular system according to the invention can also have an adapter, which enables a first interface of the second add-on module to be connected to the second interface of the first add-on module by placing this adapter between the first and second add-on modules.

According to another preferred embodiment, provision is made such that the first or second functional add-on module performs regenerative braking as an electromechanical function, the first or second functional add-on module being configured to convert kinetic energy stored in the rotation of the conveyor roller into electrical energy. During use, motorized conveyor rollers are frequently subjected to alternating accelerations and decelerations. This not only results in increased energy consumption, but also in waste heat being generated inside the conveyor roller, which is deleterious to the service life of the components arranged in the conveyor roller. According to this embodiment, the add-on module thus performs regenerative braking as a function. In regenerative braking, the energy stored in the motorized conveyor roller due to its mass and rotation velocity during a deceleration of the rotation velocity is converted into electrical energy. For example, this is achievable in that the add-on module can be switched to a generator mode or in that the add-on module performs an electronic function in such a way that when coupled to the electric drive motor of the motorized conveyor roller, the module enables the electric drive motor to operate as a generator at the onset of a braking function of the motorized conveyor roller. In addition to the kinetic energy stored in the motorized conveyor roller itself due to the mass and rotation velocity of the latter, kinetic energy stored in the conveyed products is also periodically converted via the motorized conveyor roller during a braking of the latter, this kinetic energy being transferred, via adhesive or friction contact with the motorized conveyor roller, from the product to the motorized conveyor roller. In principle, it is understood that the design of the add-on module for regenerative braking is suitable for alternatively integrating one add-on module, two add-on modules, or more than two add-on modules in the motorized conveyor roller so that the motorized roller can also be variably adapted in terms of regenerative braking performance.

According to another preferred embodiment, provision is made such that the first or second functional add-on module performs a rotational position determination as a sensing function in that the first or second functional add-on module is configured to calculate an angular position between the second axle unit and the conveyor roller tube. According to this embodiment, a rotational position determination is performed by the add-on module. In other words, it enables the angular position of the conveyor roller tube to be determined in relation to a fixed coordinate system of the first or second axle unit. This rotational position determination can be carried out in such a way that the angular position of the conveyor roller tube is detected directly. As an alternative, the angular position of the electric motor (i.e., the angular position of the rotor of the electric motor) can also be detected in relation to the first or second axle unit, and the angular position of the conveyor roller tube can then be determined from this motor angular position, with a possible reduction of the rotation of the electric motor brought about by a transmission being factored in. A rotational position determination is also understood to mean a determination of the rotational angular velocity; specifically, the rotational angular velocity and optionally also the rotational angular acceleration can be calculated from the angular position determination by conversion.

According to another preferred embodiment, provision is made such that the first bearing unit is arranged in a first end cap, which is coupled to the electric motor by means of the first interface or to the transmission module by means of the third interface, has a fifth interface for coupling to the conveyor roller tube, and a sixth interface for coupling to the first axle unit, and the second bearing unit is arranged in a second end cap, which has a seventh interface for coupling to the second axle unit and an eighth interface for coupling to the conveyor roller tube.

Providing a first and a second end cap for receiving the first and the second bearing unit, respectively, gives rise to an easy-to-manufacture design of the conveyor rollers that are produced with the modular system according to the invention. The end cap can be produced from, for example, diecast aluminum, stainless steel, or plastic, and perform a sealing function.

According to another preferred embodiment, provision is made such that the modular system comprises a first end cap made of diecast aluminum, which is connected to the conveyor roller tube at a fifth standardized interface, where it does not have a gasket for preventing undesired capillary action between the end cap and the conveyor roller tube at the fifth interface, and further comprises a second end cap made of stainless steel, which is likewise connected to the conveyor roller tube by means of the fifth interface and has a gasket (EHEDG gasket) in the region of this fifth interface for preventing undesired capillary action between the end cap and the conveyor roller tube.

Particular preference is thus given to developing the modular system further by having it comprise a first and second end cap in a first version having a first sealing action against fluids, and a first and second end cap in a second version having a second sealing action against fluids that is stronger than the first sealing action.

The first and second end caps in the first version can have a sealing action against fluids present in the conveyor roller and a sealing action against media or dirt acting on the conveyor roller from outside. A first and second end cap in a second version having a comparatively stronger sealing action against media or dirt acting on the conveyor roller from outside can be used, alternatively, without other connection interfaces being needed or having to be produced for this purpose. According to this embodiment, a conveyor roller having a high protection class (for example, IP65 or higher) can be produced from the modular system and used for applications in environments in which such protection of the interior of the conveyor roller is required due to effects from moisture or dirt. To this end, provision is typically made of a protective element that protects the actual sealing element, e.g., a radial shaft ring gasket. Such a protective element is typically arranged on the outside in relation to the radial shaft ring gasket and can be arranged, for example, between the conveyor roller tube or an end cap integrated in the conveyor roller tube and the axle element. The protective element forms a complete or partial outer seal between the parts of the conveyor roller rotating relative to one another in the region of the axle element and thus protects the gasket against outside influences. By using another end cap, a conveyor roller with a lower protection class (for example, IP44 or lower) that does not have or cannot receive such a protective element can also be produced from the modular system. Customized conveyor rollers that are adapted to the respective requirements in terms of their manufacturing costs can thus be produced from the modular system without additional manufacturing costs and stocking.

It is particularly preferable if the first and second end caps are identical. Providing identical end caps simplifies stocking even further, and manufacturing costs can be reduced by achieving high production unit numbers for the end caps. It is understood that these end caps are then preferably installed in a mirror-symmetrical manner relative to each other in the motorized conveyor roller.

Another aspect of the invention is a motorized conveyor roller which is produced from a modular system of the design described above. The motorized conveyor roller is distinguished by correspondingly standardized interfaces; i.e., specifically, a correspondingly standardized first, second, third, fourth, and/or fifth to eighth interface, which permits the use of variable components in the region of the add-on module, electric motor, transmission of the end caps, and/or conveyor roller tube without having to adapt or alter the method of connecting the components.

Still another aspect of the invention is a method for producing a motorized conveyor roller from a modular system, with the steps: providing a conveyor roller tube, integrating a first axle unit in a first end of the conveyor roller tube, integrating a second axle unit in a second end, opposite the first end, of the conveyor roller tube, mounting the conveyor roller tube so that it is capable of rotation about the first and second axle units by means of a first bearing unit on the first end and a second bearing unit on the second end, arranging an electric motor in the conveyor roller tube and mechanically coupling the motor to the conveyor roller tube via a first interface and to the second axle unit via a second interface in order to generate a torque between the conveyor roller tube and the second axle unit, characterized in that the electric motor is provided from a modular system, comprising: a motor with a first design, which is coupled to the conveyor roller tube via the first interface and to the second axle unit via the second interface, and a motor with a second design different from the first design, which is coupled to the conveyor roller tube via the first interface and to the second axle unit via the second interface.

The method can be further developed by the first design being a synchronous motor and the second design being an asynchronous motor, or by the first design being a motor having a first motor output and by the second design being a motor having a second motor output different from the first motor output.

The method can be further developed by connecting a transmission module to the electric motor by means of the first interface, wherein the transmission module reduces the torque of the electric motor and transfers it to the conveyor roller tube, wherein the transmission module is selected from a first transmission module having a first reduction ratio and a second transmission module having a second reduction ratio different from the first reduction ratio.

The method can be further developed by selecting the transmission module from a first transmission having gears made of a first material and a second transmission having gears made of a second material different from the first material.

The method can be further developed by selecting the transmission module from a first transmission having a planetary gear system and a second transmission having a design different from the planetary gear system, in particular a spur gear system.

The method can be further developed by the step of integrating a modular transfer element between the electric motor and the second axle unit and torque-proof coupling the transfer element to the electric motor via the second interface and to the second axle unit via a fourth interface, wherein the modular transfer element is selected from a modular system comprising a first functional add-on module, which is connected to the electric motor by means of the second interface and to the second axle unit by means of the fourth interface and which performs an electromechanical, sensing or thermal function, and a second functional add-on module, which performs a function different from the first functional add-on module and can be used as a modular transfer element instead of the first functional add-on module by connecting it to the electric motor by means of the second interface and to the second axle unit by means of the fourth interface.

Provision can preferably be made such that the second and fourth interfaces are identical and the first and second functional add-on modules are jointly integrated, wherein the first add-on module is connected by means of the second interface to the electric motor and connected by means of the section of the fourth interface formed thereon to the section of the second interface of the second add-on module formed on the second add-on module, and wherein the second add-on module is connected by means of the fourth interface to the second axle unit.

Still further, provision can preferably be made such that the modular system further comprises a torque-transferring intermediate piece without electromechanical, sensing, or thermal function, which is connected to the electric motor by means of the second interface and to the second axle unit by means of the fourth interface.

The method can be further developed in that regenerative braking is performed as an electromechanical function, wherein the first or second functional add-on module converts a torque into electrical energy.

The method can be further developed in that a rotational position determination is performed as a sensing function, wherein the first or second functional add-on module calculates an angular position between the second axle unit and the conveyor roller tube.

The method can be further developed by arranging the first bearing unit in a first end cap and the second bearing unit in a second end cap.

The method can be further developed by selecting the first and second end caps from a modular system comprising a first version having a first sealing action against fluids, and a second version having a second sealing action against fluids that is stronger than the first sealing action.

In particular, the sealing action relative to the inside, the sealing action relative to the outside, and the enhanced sealing action relative to fluids acting from the outside can be configured in a modular manner, for example, in the form of an alternative use of end caps with an additional seal relative to the conveyor roller tube or of end caps with an additional protective element for protecting the seal, as described above.

The method can be further developed by installing a second end cap that is identical to the first end cap.

It is understood that the method according to the invention can preferably be carried out with the modular system according to the invention. It is understood that the variants, advantages and functional actions of the modular system explained above apply in an analogous manner to the corresponding method steps of the production method.

BRIEF DESCRIPTION OF THE DRAWINGS

A preferred embodiment of the invention shall be explained with reference to the appended figures. Shown are:

FIG. 1 is a side view, cut lengthwise, of a preferred embodiment of a conveyor roller from the modular system according to the invention;

FIG. 2 is a side view, cut lengthwise, of an alternative preferred embodiment of a conveyor roller from the modular system according to the invention.

DETAILED DESCRIPTION OF THE EMBODIMENTS

Figure 3:
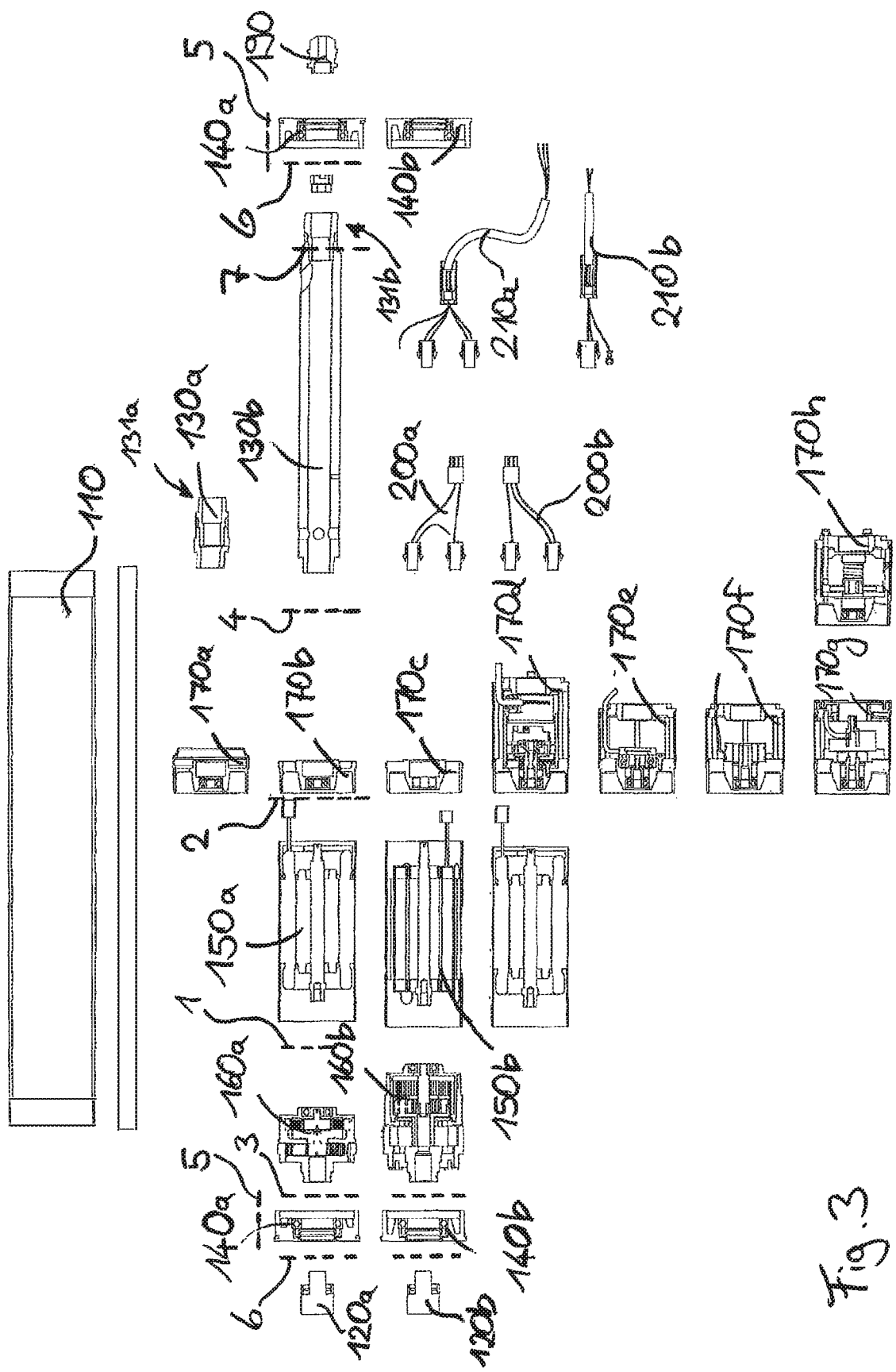
FIG. 3 is a systematic view of the modular system according to the invention.

FIG. 1 shows a motorized conveyor roller having a conveyor roller tube 10, in which are integrated a first axle unit 20 at the left end in the drawing and a second axle unit 30 at the right end in the drawing. Both axle units 20, 30 extend partially out of the conveyor roller tube 10 and thus enable the conveyor roller to be mounted in a frame or the like.

The first axle unit 20 is mounted, by means of a bearing unit 25, in a first end cap 40*a* arranged on the left end of the conveyor roller tube 10. The end cap 40*a* is connected in a torque-proof manner to the conveyor roller tube 10. A radial shaft ring gasket 24, which forms a seal between the interior enclosed by the conveyor roller tube 10 and the environment, is integrated between the end cap 40*a* and the first axle unit 20, on the outside of the bearing unit 25.

In corresponding fashion, the second axle unit 30 is rotatably mounted by means of an axle bearing unit 35 in an end cap 40*b* fastened in a torque-proof manner on the right end of the conveyor roller tube 10 and, in turn, forms a seal on this side between the interior and the environment by means of a radial shaft ring gasket 34.

The end caps 40*a*, 40*b* are identical in construction. The end caps form standardized interfaces with the axle units 20, 30 mounted and sealed therein on the one hand and with the conveyor roller tube 10 on the other hand, which can be numbered consecutively throughout as fifth and sixth interfaces 5-6, as can be discerned in FIG. 1. The end caps 40*a*, 40*b* are furthermore configured such that a third torque-transferring interface 3 is formed for receiving a torque from a transmission 60. In the motorized roller depicted in FIG. 1, this function and interface are only implemented by the left end cap 40*a*, which is integrated in a torque-transferring manner between the transmission 60 and the conveyor roller tube 10.

The transmission 60 is embodied as a multi-stage planetary gear transmission and is integrated in the conveyor roller by means of the third interface 3. The third interface 3 on the one hand constitutes an interface with the first axle unit 20, to which the planet gear carrier is coupled in a torque-proof manner. The third interface 3 further comprises a connection to the first end cap 40*a* for coupling the ring gear of the transmission 60 to the first end cap 40*a* in a torque-proof manner. A torque is transferred from the transmission 60 to the conveyor roller tube 10 via this connection of the third and fifth interfaces 3, 5.

The transmission 60 is furthermore coupled to an electric motor 50 by means of a first interface 1. The electric motor 50 is embodied as a brushless three-phase motor and has a rotor 51 and a stator 52. The rotor 51 is coupled in a torque-proof manner to a drive shaft 53, which acts on the sun gear of the first gear stage of the planetary gear transmission 60. The drive shaft 53 is mounted rotatably in an intermediate flange between the electric motor 50 and the transmission 60. The intermediate flange is in turn coupled in a torque-proof manner to a motor housing 54 encasing the electric motor 50 and to the transmission housing of the planetary gear transmission 60. The connection between this intermediate flange and the transmission 60 and the connection between the transmission shaft 61 and the rotor shaft 51 constitute the first interface 1, which is standardized in the modular system according to the invention.

On the side of the electric motor opposite this first interface 1, the electric motor is connected to an add-on module 70 by means of a second interface 2. This add-on module 70 is formed by a second intermediate flange 71, which receives a ball bearing in which the rotor shaft 51 is rotatably mounted. This second intermediate flange 71 is connected in a torque-proof manner to a torque-transferring intermediate piece 30' in the embodiment shown in FIG. 1. This intermediate piece 30' is rigidly connected to the second axle unit 30 and illustrated in interrupted form, and it is understood that the length of this intermediate piece 30' is adjustable to the length of the conveyor roller or to the length of the conveyor roller tube 10 and is consequently available in different variants.

The intermediate piece 30' is connected in a torque-proof manner to the second axle unit 30 by means of a seventh interface 7. This seventh interface 7 is formed by a force-fitting and positively locking knurled end bezel of the second axle unit 30 in an interior of the intermediate piece 30', but can also be formed in a purely positively locking, purely force-fitting, or material-locking manner.

FIG. 2 shows a second conveyor roller, which is produced from the modular system according to the invention.

As can be discerned in FIG. 2, the second conveyor roller is identical in construction to the embodiment depicted in FIG. 1 in terms of the components of the endcaps 40a, 40b, first axle unit 20, electric motor 50, and conveyor roller tube 10. However, the second embodiment of the conveyor roller from the modular system according to the invention differs from the conveyor roller shown in FIG. 1 in that for one thing, a different transmission 260 is integrated and connected to the motor 50 by means of the first interface 1.

Another difference from the motorized roller according to FIG. 1 lies in that a brake module 270 rather than the add-on module 70 is integrated between the second and fourth interfaces 2, 4. As can be discerned, the brake module 270 has the fourth interface 4, by means of which the brake module 270 is connected to an intermediate piece 230', which is shorter than the intermediate piece 30' of the motorized roller according to FIG. 1. The intermediate piece 230' is connected to the second axle unit 30 by means of the seventh interface 7. This seventh interface 7 corresponds to the seventh interface 7 of the extension piece 30' according to FIG. 1 so that a connection to the corresponding counterpart of the seventh interface 7 on the second axle unit 30 is possible. The brake module 270 furthermore has a corresponding second interface 2, which effects the coupling to the electric motor. This second interface 2 is identical in construction to the second interface 2 between the add-on module 70 and the electric motor 50 of the motorized roller according to FIG. 1.

FIG. 3 shows a systematic view of the modular system according to the invention. The modular system depicted here basically comprises twelve modular components, which can be assembled with one another to form a motorized conveyor roller. Many of these modular components are available and usable in different variants so that a specific function of the motorized conveyor roller is achieved by selecting a variant for this modular component.

In principle, an oil-filled conveyor roller tube 110 is used for each motorized roller. The conveyor roller tube 110 is tailor-made to a custom length and has a standardized interface 5 and 8 inside each of its two ends, to which end caps 140a, 140b can be secured in the conveyor roller tube in standardized fashion at both ends.

The end caps 140a, 140b to be inserted on both ends are contained in the modular system in one variant made of stainless steel 140a and in one variant made of aluminum 140b, said variants of this modular component being intended to be selected. By selecting the stainless steel cap 140a, a motorized roller for use in the food industry can thus be assembled, whereas the aluminum end cap 140b can be used for other areas without stringent hygienic requirements.

A first axle unit, which in turn can be chosen in two variants 120a and 120b of regular steel and stainless steel, respectively, extends through the left end cap 140a, 140b. A second axle unit 130a, 130b extends through the right end cap 140a, 140b.

The end caps 140a, 140b have a sixth interface 6, at which the first axle unit 120a, 120b and the second axle unit 130a, 130b, respectively, are sealed and roller bearing-mounted in the end cap. The end caps 140a, 140b also have a third interface 3, with which a transmission component 160 is torque-supported on the end cap 140a, 140b. To this end, the transmission component 160 has a suitably adapted interface 3, which furthermore has an additional function as an interface with the first axle unit 120a, 120b in order to ensure torque support on this first axle unit 120a, 120b. The transmission can thus be braced in a torque-proof manner on the first axle unit 120a, 120b on the one hand and on the end cap 140a, 140b on the other hand, and consequently a rotation can be transferred, with support, from a planetary gear transmission in that the ring gear of the transmission is braced in a torque-proof manner on the end cap and the planet gear carrier or the sun gear of the transmission is braced in a torque-proof manner on the axle unit.

By means of an opposing first interface 1, the transmission component is attached to a motor component 150a, 150b. The interface 1 can also ensure a centering and torque-proof support of a transmission housing on the motor housing on the one hand and a torque-proof transfer between the planet gear carrier or the sun gear and the drive shaft of the electric motor on the other hand. The motor component or the electric motor is provided in the modular system in a first variant 150a with an asynchronous winding and in a second variant 150b with a synchronous winding.

The electric motor has a second interface 2 on the side opposite the interface 1. This second interface 2 can be connected in a torque-proof manner to a functional module 170a-170h. As a functional module, provision is made of eight different variants in the modular system according to the invention.

A first variant 170a has a second interface for coupling to the electric motor and another interface opposite said second interface, which can be coupled in a torque-proof manner to a short version of the second axle unit 130a. This variant 170a, 130a is used for mounting a particularly short motorized roller and does not perform any additional function.

Also contained as a variant is a transfer element 170b, which can be coupled in a torque-proof manner to the electric motor by means of the second interface 2 and to a second axle unit 130b by means of a fourth interface 4. Other than the torque transfer and a mounting of the drive shaft of the electric motor, this transfer element 170b does not perform any additional functions and it is used for mounting motorized rollers of different structural lengths.

Provision is also made of a selective disable module 170c, which enables a rotation of the rotor of the electric motor with respect to the stator of the electric motor in one rotation direction, but blocks it in the opposing rotation direction. When this disable module 170c is used, the motorized roller can only turn and transfer a drive torque in one direction, whereas the motorized roller is blocked in the other direction and thus prevents, for example, a backward movement of the conveyed product contrary to the conveying direction.

The other variants 170d-170g represent different sensor units, which can be used for measuring rotational angles and rotation velocities in various non-incremental resolutions.

An eighth variant 170h is a functional brake module, which performs a braking or locking function between the drive shaft of the motor and its housing (i.e., between the rotor and the stator of the electric motor) and thus includes the function of being able to hold the motorized roller in an angular position.

In addition to the short first axle unit 130*a*, as explained above, there is another second axle unit 130*b*, which is used for constructing motorized rollers of different lengths. The second axle unit 130*b* is mechanically coupled by means of a fourth interface 4 to the functional module 170*a*-170*h* in one of the eight variants. An interface 6, with which the second axle unit 130*b* is sealed and mounted in the right end cap 130, is provided at the opposite end of the second axle unit 130*b*.

The second axle unit 130*b* receives an insert element 190 on its outside end 131*a*, 131*b*. An electric plug connection can be positioned, or an electric cable of the axle unit embodied as a hollow axle can be fed and/or sealed, between the end 131*a*, 131*b* and the insert element 190. The cable is routed to the outside and, like the alternative plug connection, is used for supplying the electric motor 150 with current and control signals.

For establishing these electric plug connections, the modular system contains pre-assembled variants of a cable harness 200*a*, 200*b* and 210*a*, 210*b*, which can be selected accordingly and installed for corresponding lengths. These cable harnesses 200*a*, 200*b*, 210*a*, 210*b* connect the electric motor and optionally an integrated encoder to the insert element 190, or are fed through the insert element 190.

The invention claimed is:

1. A modular system of motorized conveyor rollers, wherein the motorized roller tube comprises:
    a conveyor roller tube;
    a first axle unit integrated with a first end of the conveyor roller tube;
    a second axle unit integrated with a second end of the conveyor roller tube opposite the first end;
    a first bearing unit on the first end and a second bearing unit on the second end by which the conveyor roller tube is mounted rotatably about the first and second axle units, respectively; and
    an electric motor arranged in the conveyor roller tube and mechanically coupled between the second axle unit and the conveyor roller tube for generating a torque between the conveyor roller tube and the second axle unit;
    wherein the modular system comprises, as the electric motor, a motor of a first design that may be coupled to the conveyor roller tube via a first interface and to the second axle unit via a second interface, and a motor of a second design, different from the first design, that may be coupled to the conveyor roller tube via the first interface and to the second axle unit via the second interface.

2. The modular system as claimed in claim 1, wherein the motor of the first design is a synchronous motor and the motor of the second design is an asynchronous motor.

3. The modular system as claimed in claim 1, wherein the motor of the first design is a motor having a first motor output and the motor of the second design is a motor having a second motor output that is different from the first motor output.

4. The modular system as claimed in claim 1, wherein the electric motor is connected via the first interface to a transmission module that transfers the torque via a third interface to the conveyor roller tube, and wherein the modular system further comprises, as the transmission module, a first transmission having a first reduction ratio and a second transmission, different from the first transmission, having a second reduction ratio different from the first reduction ratio.

5. The modular system as claimed in claim 4, wherein the modular system further comprises, as the transmission module, a first transmission having gears of a first material and a second transmission having gears of a second material different from the first material.

6. The modular system as claimed in claim 4, wherein the modular system further comprises, as a transmission module, a first transmission having a first gear system and a second transmission having a second gear system different from the first gear system.

7. The modular system as claimed in claim 1, further comprising a modular transfer element integrated between the electric motor and the second axle unit, wherein the modular transfer element may be connected to the electric motor via the second interface and to the second axle unit via a fourth interface and transfers the torque between the electric motor and the second axle unit via the second and fourth interfaces; and
    wherein the modular transfer element comprises:
        a first functional add-on module which performs an electromechanical, sensing, or thermal function; and
        a second functional add-on module, which can be integrated within the conveyor roller instead of the first functional add-on module, and which performs an electromechanical, sensing, or thermal function that is different from the electromechanical, sensing, or thermal function of the first functional add-on module.

8. The modular system as claimed in claim 7, further comprising a torque-transferring intermediate piece without any electromechanical, sensing, or thermal function, the torque-transferring intermediate piece being connected instead of the first and second functional add-on modules to the electric motor by means of the second interface and to the second axle unit by means of the fourth interface.

9. The modular system as claimed in claim 7, wherein the second and the fourth interfaces are identical.

10. The modular system as claimed in claim 7, wherein the first or second functional add-on module performs regenerative braking as an electromechanical function and the first or second functional add-on module is configured to convert kinetic energy stored in the rotation of the conveyor roller into electrical energy.

11. The modular system as claimed in claim 7, wherein the first or second functional add-on module performs a rotational position determination as a sensing function and the first or second functional add-on module is configured to calculate an angular position between the second axle unit and the conveyor roller tube.

12. The modular system as claimed in claim 1, wherein:
    the first bearing unit is arranged in a first end cap coupled to the electric motor by means of the first interface or to a transmission module by means of a third interface, and the first end cap has a fifth interface for coupling to the conveyor roller tube and a sixth interface for coupling to the first axle unit; and
    the second bearing unit is arranged in a second end cap, the second end cap having a seventh interface for coupling to the second axle unit and an eighth interface for coupling to the conveyor roller tube.

13. The modular system as claimed in claim 12, wherein the modular system comprises:
    the first and second end cap in a first version having a first sealing action against fluids, and the first and second end cap in a second version having a second sealing action against fluids that is stronger than the first sealing action.

14. A motorized conveyor roller produced from a modular system as claimed in claim 1.

15. A method for producing a motorized conveyor roller from a modular system, the method comprising the steps of:
providing a conveyor roller tube;
integrating a first axle unit in a first end of the conveyor roller tube;
integrating a second axle unit in a second end, opposite the first end, of the conveyor roller tube;
mounting the conveyor roller tube so that it is capable of rotation about the first and second axle units by means of a first bearing unit on the first end and a second bearing unit on the second end; and
arranging an electric motor in the conveyor roller tube and mechanically coupling the electric motor to the conveyor roller tube via a first interface and to the second axle unit via a second interface in order to generate a torque between the conveyor roller tube and the second axle unit,
wherein the electric motor is provided from a modular system further comprising:
a motor with a first design that may be coupled to the conveyor roller tube via the first interface and to the second axle unit via the second interface, and
a motor with a second design, different from the first design, that may be coupled to the conveyor roller tube via the first interface and to the second axle unit via the second interface.

16. The method as claimed in claim 15, wherein:
the motor of the first design is a synchronous motor and the motor of the second design is an asynchronous motor, or
the motor of the first design is a motor having a first motor output and the motor of the second design is a motor having a second motor output different from the first motor output.

17. The method as claimed in claim 15, wherein a transmission module is connected to the electric motor by means of the first interface and the transmission module reduces the torque of the electric motor and transfers it to the conveyor roller tube, and
wherein the transmission module is selected from a first transmission module having a first reduction ratio and a second transmission module having a second reduction ratio different from the first reduction ratio.

18. The method as claimed in claim 17, wherein the transmission module is selected from a first transmission having gears made of a first material and a second transmission having gears made of a second material different from the first material.

19. The method as claimed in claim 17, wherein the transmission module is selected from a first transmission having a planetary gear system and a second transmission having a spur gear system.

20. The method as claimed in claim 15, further comprising the steps of:
integrating a modular transfer element between the electric motor and the second axle unit and a torque-proof coupling of the transfer element to the electric motor via the second interface and to the second axle unit via a fourth interface,
wherein the modular transfer element is selected from a modular system comprising:

a first functional add-on module connected to the electric motor by means of the second interface and to the second axle unit by means of the fourth interface and performs an electromechanical, sensing, or thermal function, and
a second functional add-on module that performs an electromechanical, sensing, or thermal function different from the first functional add-on module and that can be used as a modular transfer element instead of the first functional add-on module by connecting it to the electric motor by means of the second interface and to the second axle unit by means of the fourth interface.

21. The method as claimed in claim 20, wherein the second and the fourth interfaces are identical and the first and the second functional add-on modules are jointly integrated in that the first add-on module is connected by means of the second interface to the electric motor and connected by means of the section of the fourth interface formed thereon to a section of the second interface of the second add-on module formed on the second add-on module, and the second add-on module is connected by means of the fourth interface to the second axle unit.

22. The method as claimed in claim 20, wherein the modular system further comprises a torque-transferring intermediate piece without any electromechanical, sensing, or thermal function connected to the electric motor by means of the second interface and to the second axle unit by means of the fourth interface.

23. The method as claimed in claim 20, wherein regenerative braking is performed as the electromechanical function by the first or second functional add-on module converting a torque into electrical energy.

24. The method as claimed in claim 20, wherein a rotational position determination is performed as a sensing function by the first or second functional add-on module calculating an angular position between the second axle unit and the conveyor roller tube.

25. The method as claimed in claim 20, wherein the first bearing unit is arranged in a first end cap and the second bearing unit is arranged in a second end cap, and wherein the first and the second end caps are selected from a modular system comprising:
a first version having a first sealing action against fluids, and
a second version having a second sealing action against fluids that is stronger than the first sealing action.

26. A modular system of motorized conveyor rollers, wherein the motorized roller tube comprises:
a conveyor roller tube;
a first axle unit integrated with a first end of the conveyor roller tube;
a second axle unit integrated with a second end of the conveyor roller tube opposite the first end;
a first bearing unit on the first end and a second bearing unit on the second end by which the conveyor roller tube is mounted rotatably about the first and second axle units, respectively;
an electric motor arranged in the conveyor roller tube and mechanically coupled between the second axle unit and the conveyor roller tube for generating a torque between the conveyor roller tube and the second axle unit; and
a modular transfer element integrated between the electric motor and the second axle unit, wherein the modular transfer element may be connected to the electric motor via a second interface and to the second axle unit via a fourth interface and transfers the torque between the electric motor and the second axle unit via the second and fourth interfaces; and wherein the modular system comprises, as the electric motor, a motor of a first design that may be coupled to the conveyor roller tube via a first interface and to the second axle unit via the second interface, and a motor of a second design, different from the first design, that may be coupled to the conveyor roller tube via the first interface and to the second axle unit via the second interface; and wherein the modular transfer element comprises:

a first functional add-on module which performs an electromechanical, sensing, or thermal function; and a second functional add-on module, which can be integrated within the conveyor roller instead of the first functional add-on module, and which performs an electromechanical, sensing, or thermal function that is different from the electromechanical, sensing, or thermal function of the first functional add-on module.

* * * * *